US012783765B2

(12) United States Patent
Song et al.

(10) Patent No.: US 12,783,765 B2
(45) Date of Patent: Nov. 3, 2026

(54) METHOD FOR FLIP-FLOP UNIT

(71) Applicant: HANGZHOU SILAN MICROELECTRONICS CO., LTD., Hangzhou (CN)

(72) Inventors: Weiquan Song, Hangzhou (CN); Xiangdong Chen, Hangzhou (CN)

(73) Assignee: HANGZHOU SILAN MICROELECTRONICS CO., LTD., Hangzhou (CN)

( * ) Notice: Subject to any disclaimer, the term of this patent is extended or adjusted under 35 U.S.C. 154(b) by 144 days.

(21) Appl. No.: 18/832,270

(22) PCT Filed: Mar. 9, 2023

(86) PCT No.: PCT/CN2023/080582
§ 371 (c)(1),
(2) Date: Jul. 23, 2024

(87) PCT Pub. No.: WO2023/143631
PCT Pub. Date: Aug. 3, 2023

(65) Prior Publication Data
US 2025/0165687 A1 May 22, 2025

(30) Foreign Application Priority Data
Jan. 28, 2022 (CN) ......................... 202210107336.2

(51) Int. Cl.
*G06F 30/327* (2020.01)
*G06F 30/33* (2020.01)
(Continued)

(52) U.S. Cl.
CPC ............ *G06F 30/327* (2020.01); *G06F 30/33* (2020.01); *G06F 30/3312* (2020.01); *H03K 3/037* (2013.01); *G06F 2117/04* (2020.01)

(58) Field of Classification Search
CPC ..................................................... G06F 30/327
(Continued)

(56) References Cited

U.S. PATENT DOCUMENTS 6,457,167 B1 9/2002 Kitahara
9,317,639 B1 * 4/2016 Jain ......................... G06F 30/32
(Continued)

FOREIGN PATENT DOCUMENTS

CN 101078944 A 11/2007
CN 102857198 A 1/2013
(Continued)

OTHER PUBLICATIONS

International Search Report (including English translation) and Written Opinion for International Application No. PCT/CN2023/080582, mailed May 24, 2023, 10 pages.
(Continued)

*Primary Examiner* — Eric D Lee
(74) *Attorney, Agent, or Firm* — Westman, Champlin & Koehler, P.A.

(57) ABSTRACT

Disclosed is a flip-flop unit design method comprising: analyzing signal delay of a clock control signal in a digital circuit; selecting a clock gating circuit among a plurality of types of clock gating circuits according to the signal delay, and coupling at least one edge-triggered flip-flop and the selected clock gating circuit to be a flip-flop unit, wherein the plurality of types of clock gating circuits enable or disable a first clock signal according to the clock control signal to generate a second clock signal, and the edge-triggered flip-flop transmits data at an edge of the second clock signal. The design method eliminates the glitch in the clock signal generated by the clock gating circuit, reduces the number of logic devices of the clock gating circuit, reduces the power consumption of the clock gating circuit.
(Continued)

200

The design method is applicable to a flip-flop group with any number of edge-triggered flip-flops.

16 Claims, 7 Drawing Sheets

(51) Int. Cl.
*G06F 30/3312* (2020.01)
*H03K 3/037* (2006.01)
*G06F 117/04* (2020.01)

(58) Field of Classification Search
USPC .......................................................... 716/104
See application file for complete search history.

(56) References Cited

U.S. PATENT DOCUMENTS

| | | | |
|---|---|---|---|
| 2001/0014964 A1 | 8/2001 | Kawarabyashi et al. | |
| 2003/0009733 A1 | 1/2003 | Hathaway et al. | |
| 2005/0028118 A1 | 2/2005 | Kapoor et al. | |

FOREIGN PATENT DOCUMENTS

| | | | |
|---|---|---|---|
| CN | 104852712 | A | 8/2015 |
| CN | 114417758 | A | 4/2022 |
| CN | 114417759 | A | 4/2022 |
| EP | 2494692 | B1 | 11/2016 |
| JP | H10283381 | A | 10/1998 |
| JP | H10294375 | A | 11/1998 |
| JP | 2011164988 | A | 8/2011 |

OTHER PUBLICATIONS

Translation of Office Action for Japanese Patent Application No. JP 2024-544831, dated Jun. 5, 2025, 16 pages.
Translation of Notice of Grant of Patent Rights for Chinese Patent Application No. CN 202210107336.2, dated Nov. 1, 2022, 2 pages.
Translation of Notice of First Examination Opinion for Chinese Patent Application No. CN 202210107336.2, dated Jul. 11, 2022, 10 pages.
Translation of Notice of Second Examination Opinion for Chinese Patent Application No. CN 202210107336.2, dated Sep. 27, 2022, 8 pages.
European Search Report for European application No. 23746507.5, dated Dec. 17, 2026, 9 pages.

* cited by examiner

METHOD FOR FLIP-FLOP UNIT

CROSS-REFERENCE TO RELATED APPLICATION(S)

This application is a Section 371 National Stage application of International Application No. PCT/CN2023/080582, which was filed on Mar. 9, 2023 and published as WO 2023/143631 A1 on Aug. 3, 2023, which claims priority to the Chinese patent application No. 202210107336.2, filed on Jan. 28, 2022, and entitled "DESIGN METHOD FOR FLIP-FLOP UNIT", the contents of which are incorporated herein by reference in their entireties.

FIELD OF TECHNOLOGY

The present disclosure relates to integrated circuit technology, and more particularly, to a design method for a flip-flop unit.

BACKGROUND

Electronic Design Automation (EDA) software is an important tool for functional design, synthesis, verification, physical design and other processes of integrated circuits. In digital circuit design with EDA, a standard cell library is the basic part of the back-end design process of the integrated circuit chip. The design efficiency can be improved by using pre-designed and optimized library cells for automatic logic synthesis and layout placement and routing. Optimized library cells can improve circuit performance and reduce power consumption.

In the digital part of an integrated circuit, gate circuits may be used to generate a logical operation result from a plurality of signals by combinational logical operations, and an edge-triggered flip-flop may be used to store the logical operation result. According to the different logical operations, gate circuits can be divided into AND gate, OR gate, NOT gate, NAND gate, AND-OR gate, XOR gate, and so on. The logical operation result of the gate circuits is, for example, a pulse signal. A steady-state level signal is generated according to the pulse signal, and corresponds to a logic state.

The edge-triggered flip-flop is an information storage device with memory function, for storing and memorizing the logical operation result. For example, the edge-triggered flip-flop is the most-basic logic unit in a variety of timing digital circuit modules, and is an important unit circuit in digital circuit modules. Referring to FIGS. 1 and 2, depending on the type of the edge-triggered flip-flop, the edge-triggered flip-flop 110 is triggered at a rising edge or a falling edge of a clock signal to transmit input data from an input terminal to an output terminal to obtain output data. The edge-triggered flip-flop 110 is, for example, a D-type flip-flop. For example, the D-type flip-flop transmits data on a triggering edge of the clock signal and holds the data until a next triggering edge.

The power consumption of edge-triggered flip-flop includes static power consumption and dynamic power consumption. The static power consumption is mainly caused by a leakage current, and the dynamic power consumption is mainly caused by power consumption for signal flipping. The flipping of a data signal of the edge-triggered flip-flop results in the additional data power consumption of subsequent-stage combinational logic units, and the flipping of a clock signal also results in the clock power consumption of the edge-triggered flip-flop itself.

Therefore, it is expected to optimize the design of edge-triggered flip-flops in the standard cell library of an EDA tool of digital circuits and further reduce the dynamic power consumption of edge-triggered flip-flops.

SUMMARY OF THE DISCLOSURE

In view of the above problems, it is an object of the present disclosure to provide a design method for a flip-flop unit to select a clock gating circuit among a plurality of types of clock gating circuits according to a delay condition of a clock control signal, so as to reduce the number of logic devices of the clock gating circuit and reduce power consumption of the clock gating circuit.

According to one aspect of the present disclosure, there is provided a design method for a flip-flop unit, comprising: analyzing signal delay of a clock control signal in a digital circuit; selecting a clock gating circuit among a plurality of types of clock gating circuits according to the signal delay of the clock control signal, and coupling at least one edge-triggered flip-flop and the selected clock gating circuit to be a flip-flop unit, wherein the plurality of types of clock gating circuits enable or disable a first clock signal according to the clock control signal to generate a second clock signal, and the edge-triggered flip-flop transmits data at an edge of the second clock signal.

Optionally, the plurality of types of clock gating circuits include at least one of a first clock gating circuit and a second clock gating circuit, wherein the first clock gating circuit and the second clock gating circuit maintain the second clock signal at a predetermined level at least in a clock cycle during which the clock control signal is flipped from a valid state to an invalid state.

Optionally, the first clock gating circuit and the second clock gating circuit maintain the second clock signal at the predetermined level in clock cycles during which the clock control signal maintains an invalid state.

Optionally, the first clock gating circuit and the second clock gating circuit copy the first clock signal as the second clock signal in a clock cycle during which the clock control signal is flipped from an invalid state to a valid state.

Optionally, the first clock gating circuit and the second clock gating circuit copy the first clock signal as the second clock signal in clock cycles during which the clock control signal maintains a valid state.

Optionally, the first clock gating circuit performs a logical OR operation on an inverted signal of the clock control signal and the first clock signal to generate the second clock signal.

Optionally, the second clock gating circuit performs a logical AND operation on the clock control signal and the first clock signal to generate the second clock signal.

Optionally, the plurality of types of clock gating circuits further comprises a third clock gating circuit, wherein the third clock gating circuit maintains the second clock signal at a predetermined level at least in a next clock cycle following the clock cycle during which the clock control signal is flipped from a valid state to an invalid state.

Optionally, the third clock gating circuit performs a logical AND operation on a latched signal of the clock control signal and the first clock signal to generate the second clock signal.

Optionally, the signal delay of the clock control signal varies within a range between a minimum delay and a maximum delay.

Optionally, in a case that both the minimum delay and the maximum delay occur in a first-level phase of the first clock signal, one of the first clock gating circuit and the second clock gating circuit is selected according to a starting edge at the first-level phase.

Optionally, the selected clock gating circuit is the first clock gating circuit in a case that the starting edge at the first-level phase is a rising edge.

Optionally, the selected clock gating circuit is the second clock gating circuit in a case that the starting edge at the first-level phase is a falling edge.

Optionally, the predetermined level is a level of the first-level phase.

Optionally, in a case that the minimum delay and the maximum delay occur respectively in a first-level phase and a second-level phase of the first clock signal, the selected clock gating circuit is the third clock gating circuit.

Optionally, the predetermined level is a level of the second-level phase.

Optionally, the step of coupling to be the flip-flop unit comprises selecting clock cycles during which the edge-triggered flip-flop transmits data according to the type of the selected clock gating circuit and the type of the edge-triggered flip-flop.

Optionally, the second clock signal provides a triggering edge of the edge-triggered flip-flop in a clock cycle during which the clock control signal is flipped, in a case that a starting edge at the first-level phase is the same as the triggering edge of the edge-triggered flip-flop.

Optionally, the second clock signal provides a triggering edge of the edge-triggered flip-flop in a clock cycle preceding a clock cycle during which the clock control signal is flipped, in a case that a starting edge at the first-level phase is opposite to the triggering edge of the edge-triggered flip-flop.

Optionally, the step of coupling to be the flip-flop unit comprises inverting the second clock signal to generate a third clock signal.

Optionally, the second clock signal provides a triggering edge of the edge-triggered flip-flop in a clock cycle during which the clock control signal is flipped, in a case that a starting edge at the first-level phase is the same as the triggering edge of the edge-triggered flip-flop.

Optionally, the third clock signal provides a triggering edge of the edge-triggered flip-flop in a clock cycle during which the clock control signal is flipped, in a case that a starting edge at the first-level phase is opposite to the triggering edge of the edge-triggered flip-flop.

Optionally, a high level of the clock control signal indicates a valid state, and a low level of the clock control signal indicates an invalid state.

According to an embodiment of the present disclosure, in a design method for a flip-flop unit, a clock gating circuit is selected among a plurality of types of clock gating circuits according to a delay condition of a clock control signal. The glitch in the clock signal generated by the clock gating circuit can be eliminated by the circuit characteristics of different types of clock gating circuits under different delay conditions of the clock control signal. The second clock signal generated by the clock gating circuit disables clock flipping and data transmission of the edge-triggered flip-flop in clock cycles during which the clock control signal maintains in an invalid state, so that the dynamic power consumption of the edge-triggered flip-flop can be reduced.

In a preferred embodiment, the first clock gating circuit is selected in a case that the range between the minimum delay and the maximum delay of the clock control signal falls within a single-level phase and the starting edge of the single-level phase is a rising edge. The first clock gating circuit performs a logical OR operation on an inverted signal of the clock control signal and the first clock signal to generate the second clock signal. The glitch in the clock signal generated by the clock gating circuit can be eliminated. In a clock cycle during which the clock control signal is flipped from a valid state to an invalid state, the second clock signal generated by the clock gating circuit disables the clock flipping of the edge-triggered flip-flop, so that the dynamic power consumption of the edge-triggered flip-flop can be reduced.

In a preferred embodiment, the second clock gating circuit is selected in a case that the range between the minimum delay and the maximum delay of the clock control signal falls within a single-level phase and the starting edge of the single-level phase is a falling edge, the second clock gating circuit performs a logical AND operation on the clock control signal and the first clock signal to generate the second clock signal. The glitch in the clock signal generated by the clock gating circuit can be eliminated. In a clock cycle during which the clock control signal is flipped from a valid state to an invalid state, the second clock signal generated by the clock gating circuit disables the clock flipping of the edge-triggered flip-flop, so that the dynamic power consumption of the edge-triggered flip-flop can be reduced.

In a preferred embodiment, in a case that one of the first clock gating circuit and the second clock gating circuit is selected, the glitch in the clock signal generated by the clock gating circuit can be eliminated even if the latch is omitted. Therefore, less hardware logic is needed in the clock gating circuit, and the operating power consumption of the clock gating circuit itself is lower. Any number of edge-triggered flip-flops in a flip-flop unit may form a flip-flop group with shared clock gating circuit. In a case that the flip-flop group includes any number of edge-triggered flip-flops, for example, one, two, or more, the increased power consumption due to the power consumption of the clock gating circuit itself is much less than the reduced power consumption of the edge-triggered flip-flops by clock gating. Thus, the flip-flop unit can always reduce power consumption.

Furthermore, the circuit design method for the flip-flop unit optimizes the combination of the clock gating circuit and the edge-triggered flip-flop, so that the layout design can be simplified and the layout area can be reduced. Various combinations of the clock gating circuit and the edge-triggered flip-flop may be included in a standard cell library as library cells, and may be selected under different conditions to improve the performance and design efficiency of a digital circuit.

BRIEF DESCRIPTION OF THE DRAWINGS

The above and other objects, features and advantages of the present disclosure will become more apparent from the following description of embodiments of the present disclosure with reference to the accompanying drawings.

DESCRIPTION OF THE EMBODIMENTS

Figure 1:
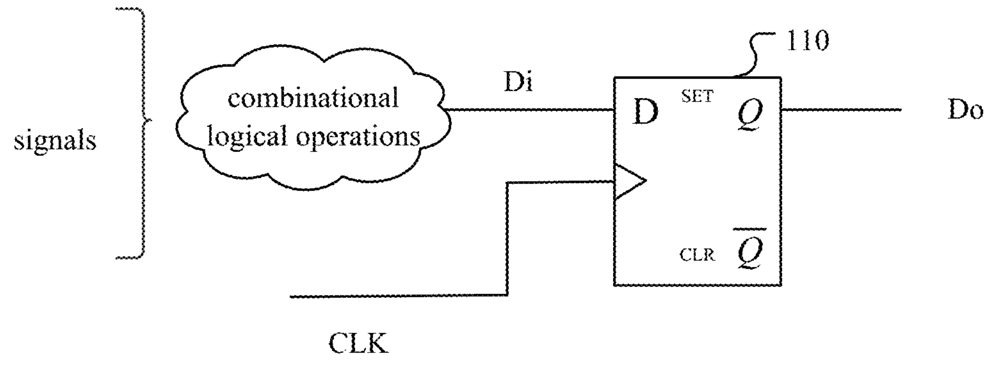
FIGS. 1 and 2 show a schematic circuit diagram and a waveform diagram, respectively, of an edge-triggered flip-flop in an integrated circuit.
Figure 2:
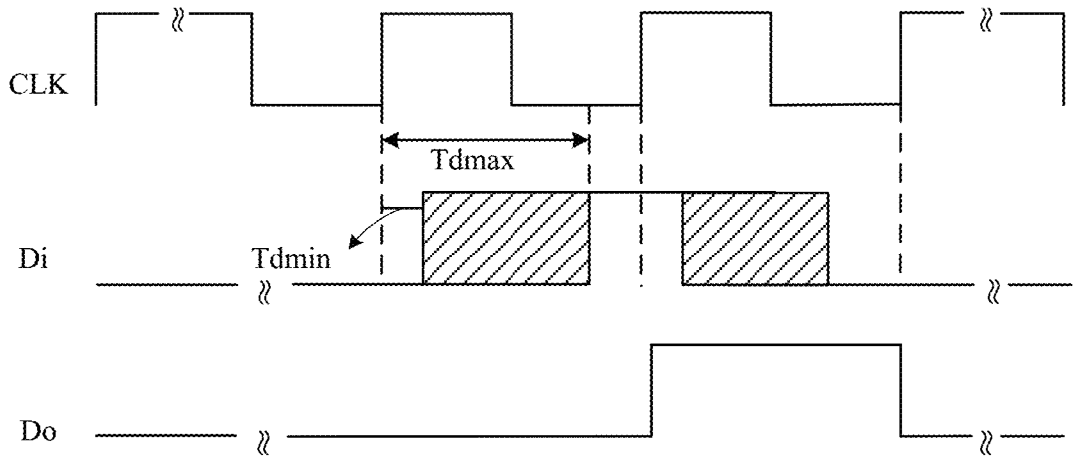

Hereinafter, that present disclosure will be describe in more detail with reference to the accompanying drawings. Like elements in the various drawings are identified with like reference numerals. For the sake of clarity, various portions of the drawings have not been drawn to scale. In addition, some well-known parts may not be shown.

Numerous specific details of the disclosure, such as device structures, materials, dimensions, processes, and techniques, are set forth in the following description in order to provide a clearer understanding of the disclosure. It will be understood by those skilled in the art that the present disclosure may be practiced without these specific details.

The present disclosure may be embodied in various forms, some examples of which are described below.

Figure 3:
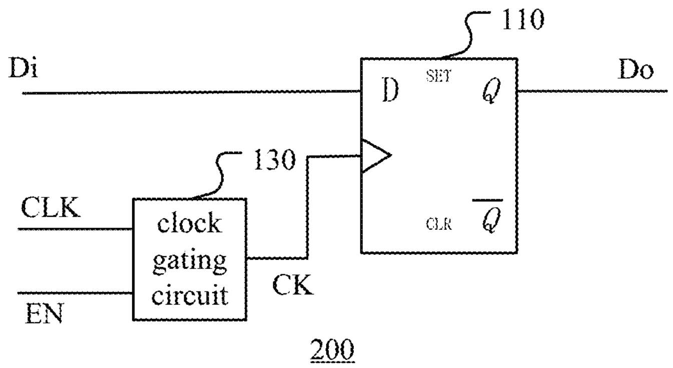
FIG. 3 shows a schematic circuit diagram of a flip-flop unit.

FIG. 3 shows a schematic circuit diagram of a flip-flop unit. The flip-flop unit 200 includes an edge-triggered flip-flop 110 and a clock gating circuit 130. The clock gating circuit 130 is used for gating the clock signal CK of the edge-triggered flip-flop 110. In this embodiment, the edge-triggered flip-flop 110 is, for example, a D-type flip-flop.

The edge-triggered flip-flop 110 includes a data input terminal, a data output terminal, and a clock input terminal. The clock gating circuit 130 includes an input terminal, an output terminal, and a control terminal. The clock gating circuit 130 receives a clock signal CLK at the input terminal, provides a clock signal CK at the output terminal, and receives a clock control signal EN at the control terminal. The edge-triggered flip-flop 110 receives input data Di at the data input terminal, receives the clock signal CK at the clock input terminal, and provides output data Do at the data output terminal.

The edge-triggered flip-flop 110 transmits the input data from the data input terminal to the data output terminal at a triggering edge, e.g., a rising edge, of the clock signal CK. Thus, the output data at the data output terminal of the edge-triggered flip-flop 110 has a signal level which corresponds to that of the input data at the data input terminal before the triggering edge of the clock signal CK and is maintained for one clock cycle after the triggering edge of the clock signal CK. The data output terminal of the edge-triggered flip-flop 110 may have two complementary output terminals.

The clock gating circuit 130 performs a logical operation on the clock control signal EN and the clock signal CLK to generate the clock signal CK of the edge-triggered flip-flop 110.

In the above-described flip-flop unit, the clock gating circuit 130 controls the transmission of the clock signal according to the state of the clock control signal EN.

in clock cycles during which the clock control signal EN is maintained to be valid, the clock gating circuit 130 copies the clock signal CLK as the clock signal CK, which is further provided to the clock input terminal of the edge-triggered flip-flop 110. in clock cycles during which the clock control signal EN is maintained to be invalid, the clock gating circuit 130 disables the clock signal CLK and maintains the clock signal CK at a predetermined level.

In a case that the clock signal CK is maintained at a predetermined level, the clock signal CK cannot provide a triggering edge of the edge-triggered flip-flop 110, and thus clock flipping and data transmission of the edge-triggered flip-flop 110 may be disabled. Furthermore, the edge-triggered flip-flop 110 prevents data from entering subsequent-stage digital circuits, so that additional data power consumption in the subsequent-stage combinational logic units for inverting data signal can be avoided.

Figure 4:
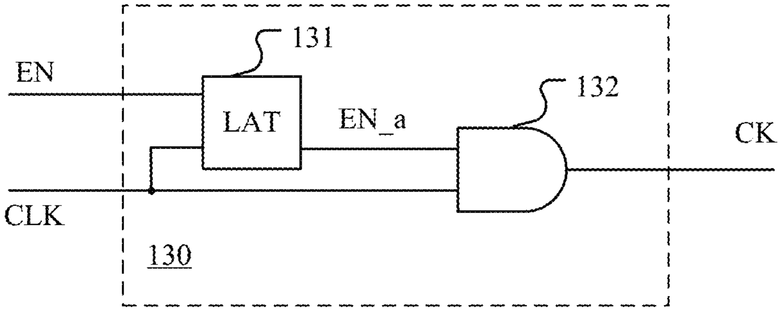
FIGS. 4 and 5 show a schematic circuit diagram and a waveform diagram, respectively, of a clock gating circuit according to the prior art.

FIG. 4 shows a schematic circuit diagram of a clock gating circuit according to the prior art. Referring to FIG. 3, a clock gating circuit 130 and an edge-triggered flip-flop 110 together constitute a flip-flop unit. The clock gating circuit 130 provides a clock signal CK to the edge-triggered flip-flop 110.

The clock gating circuit 130 includes a latch 131 and an AND gate 132. The latch 131 latches a clock control signal EN at a first-level phase T1 of the clock signal CLK, and transmits the clock control signal EN at a second-level phase T2 of the clock signal CLK. The AND gate performs a logical AND operation on a latched signal EN_a and the clock signal CLK to generate the clock signal CK.

The latch 131 includes a first input terminal, a second input terminal, and an output terminal. The AND gate 132 includes a first input terminal, a second input terminal, and an output terminal. The latch 131 receives the clock signal CLK at the first input terminal receiving, and receives the clock control signal EN at the second input terminal. The AND gate 132 receives the clock signal CLK at the first input terminal, with the second input terminal being coupled to the output terminal of the latch 131, and provides the clock signal CK at the output terminal.

A rising-edge-triggered flip-flop will be taken as an example for illustration, while the clock control signal EN indicates a valid state with a high level and an invalid state with a low level. Each clock cycle of the clock signal CLK includes a first-level phase T1 and a second-level phase T2 successively between adjacent rising edges. The first-level phase T1 and the second-level phase T2 have a high level and a low level, respectively. The clock signal CK provides a triggering edge of the edge-triggered flip-flop 110 at which the edge-triggered flip-flop 110 transmits the input data from the input terminal to the output terminal.

Figure 5:
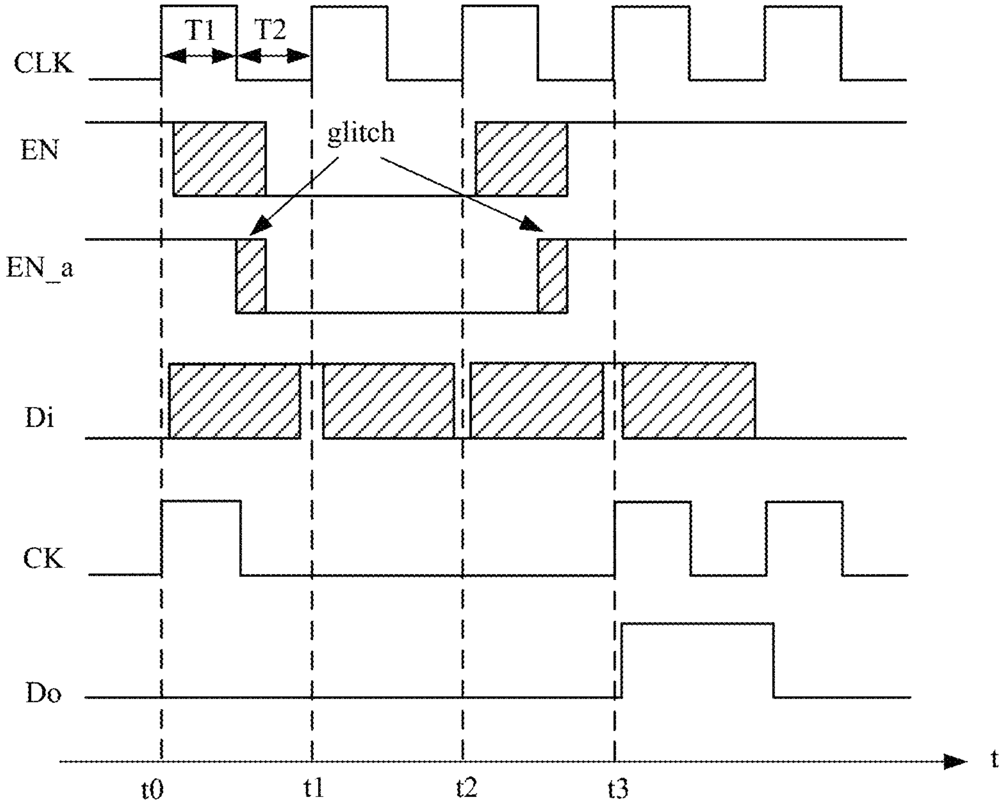

Referring to FIG. 5, each of the input data Di and the clock control signal EN has signal delay Td with respect to an edge of the clock signal. A range between a minimum delay Tdmin and a maximum delay Tdmax of the signal delay Td is hatched, respectively. The signal delay Td of the clock control signal EN varies between the minimum delay Tdmin and the maximum delay Tdmax.

As shown in FIG. 5, the minimum delay Tdmin and the maximum delay Tdmax are respectively at the first-level phase T1 and the second-level phase T2, and the flipping of the clock control signal EN may occur at the first-level phase T1 of the clock signal CLK, or at the second-level phase T2 of the clock signal CLK.

At time t0, the clock signal CLK reaches a rising edge that comes first and the clock control signal EN is valid. In one clock cycle starting from time t0, the clock control signal EN is flipped from a valid state to an invalid state. At the first-level phase T1 of the clock signal CLK, a signal level of the latched signal EN_a at the output terminal of the latch

131 is maintained at the previous state, that is, a high level. At the second-level phase T2 of the clock signal CLK, the latch 131 transmits the clock control signal EN from the input terminal to the output terminal.

If the signal delay Td of the clock control signal EN is less than or equal to the first-level phase T1 of the clock signal CLK, the latched signal EN_a is a replica of the clock signal CLK in the clock cycle during which the clock control signal is flipped. If the signal delay Td of the clock control signal EN is greater than the first-level phase T1 of the clock signal CLK, a glitch occurs in the latched signal EN_a during the second-level phase T2 of the clock signal CLK. The clock signal CK is the result of a logical AND operation of the clock signal CLK and the latched signal EN_a, and the logical AND operation can eliminate the glitch of the latched signal EN_a during the second-level phase T2 of the clock signal CLK.

Therefore, in one clock cycle after time t0, the clock gating circuit 130 copies the clock signal CLK as the clock signal CK and provides a rising edge of the clock signal CK, and the output data Do of the edge-triggered flip-flop 110 has a signal level that corresponds to a signal level of the input data Di at time t0, for example, a low level as shown in FIG. 5.

At time t1, the clock signal CLK reaches a second rising edge and the clock control signal EN is invalid. The clock control signal EN is maintained in an invalid state for one clock cycle after time t1. At the first-level phase T1 of the clock signal CLK, the signal level of the latched signal EN_a at the output terminal of the latch 131 is maintained at the previous state, that is, a low level. At the second-level phase T2 of the clock signal CLK, the latch 131 transmits the clock control signal EN from the input terminal to the output terminal. In this clock cycle, the clock control signal EN is maintained at a low level, so that the clock signal EN_a is also maintained at a low level, and the clock signal CK is also maintained at a low level as a result of a logical AND operation of the clock signal CLK and the latched signal EN_a.

At time t2, the clock signal CLK reaches a third rising edge and the clock control signal EN is invalid. In one clock cycle after time t2, the clock control signal EN is flipped from an invalid state to a valid state. At the first-level phase T1 of the clock signal CLK, the signal level of the latched signal EN_a at the output terminal of the latch 131 is maintained at the previous state, that is, a low level. At the second-level phase T2 of the clock signal CLK, the latch 131 transmits the clock control signal EN from the input terminal to the output terminal. If the signal delay Td of the clock control signal EN is less than or equal to the first-level phase T1 of the clock signal CLK, the latched signal EN_a is a replica of the clock signal CLK in the clock cycle during which the clock control signal is flipped. If the signal delay Td of the clock control signal EN is greater than the first-level phase T1 of the clock signal CLK, a glitch occurs in the latched signal EN_a during the second-level phase T2 of the clock signal CLK. The clock signal CK is the result of a logical AND operation of the clock signal CLK and the latched signal EN_a. The logical AND operation can eliminate the glitch of the latched signal EN_a during the second-level phase T2 of the clock signal CLK.

Therefore, in the two clock cycles from time t1, the clock gating circuit 130 disables the clock signal CLK and does not provide a rising edge of the clock signal CK. The signal level of the output data Do of the edge-triggered flip-flop 110 corresponds to the signal level in the previous clock cycle, for example, a low level as shown in FIG. 5.

The above-described clock gating circuit 130 controls the transmission of the clock signal according to the state of the clock control signal EN.

The clock gating circuit 130 copies the clock signal CLK as the clock signal CK in a clock cycle during which the clock control signal EN is flipped from a valid state to an invalid state. In such a case, the clock signal CK provides a triggering edge of the edge-triggered flip-flop 110. The clock gating circuit 130 allows the clock flipping and data transmission of the edge-triggered flip-flop 110, and the output data Do provided by the edge-triggered flip-flop 110 is the input data Di at the current triggering edge.

The clock gating circuit 130 disables the clock signal CLK and maintains the clock signal CK at a predetermined level in a clock cycle during which the clock control signal EN is flipped from an invalid state to a valid state. In such a case, the clock signal CK fails to provide a triggering edge of the edge-triggered flip-flop 110. The clock gating circuit 130 disables the clock flipping and data transmission of the edge-triggered flip-flop 110, and the edge-triggered flip-flop 110 maintains the input data Di at the previous triggering edge, so that the dynamic power consumption of the edge-triggered flip-flop 110 can be reduced.

The clock gating circuit 130 described above has a low requirement on the timing of the clock control signal EN. If it is desired to disable the data transmission at a predetermined time, the flipping of the clock control signal EN from a valid state to an invalid state may be completed in the last entire clock cycle just before the predetermined time, and the flipping of the clock control signal EN from an invalid state to a valid state may be completed in the last clock cycle after the predetermined time.

The inventors notice that flip-flop units provided in a standard cell library of the EDA tool of digital circuits are implemented with the clock gating circuit 130 described above. The clock gating circuit 130 includes a latch 131 for eliminating a glitch that may occur in the clock signal CK of the edge-triggered flip-flop 110.

However, too much hardware logic is needed in the latch 131, resulting in too high operating power consumption of the clock gating circuit 130 itself. The operating power consumption of the clock gating circuit 130 itself may even exceed the reduced power consumption of the edge-triggered flip-flop with clock gating. In a flip-flop unit, the clock gating circuit 130 may provide the clock signal CK to a plurality of edge-triggered flip-flops 110 in a flip-flop group. If the clock gating circuit 130 is used, there is a restriction in the circuit design that the number of the edge-triggered flip-flops in the flip-flop group is not less than 3 to 8, so as to ensure that the operating power consumption of the clock gating circuit 130 of the flip-flop unit 200 is less than the reduced power consumption of the plurality of edge-triggered flip-flops 110 by the clock gating circuit 130.

Furthermore, the inventors notice that most of the conventional EDA tools can obtain signal delay Td of the clock control signal EN. The signal delay Td of the clock control signal EN can be calculated and determined by optimizing circuit design and circuit simulation, such that the minimum delay Tdmin and the maximum delay Tdmax of the signal delay Td falls within a selected level phase of the clock signal CLK.

The present inventors have designed a clock gating circuit 230 and a clock gating circuit 330 by selecting a clock gating circuit according to delay condition of the clock control signal EN, which have the same function as the clock gating circuit 130 even without using a latch. The clock gating circuit 230 and the clock gating circuit 330 may be added for a redesigned flip-flop unit in a standard cell library of an EDA tool of digital circuits. Therefore, the power consumption of the integrated circuit can be further reduced, the cost of the flip-flop unit can be reduced, and the power consumption of the clock gating circuit can be reduced, thereby breaking through the restriction in the circuit design.

Figure 6:
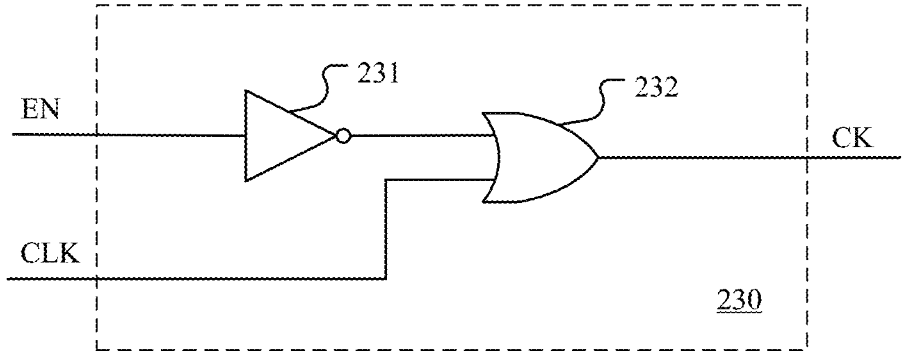
FIGS. 6 and 7*a*, 7*b* show schematic circuit diagrams and waveform diagrams, respectively, of a clock gating circuit according to a first embodiment of the present disclosure.

FIG. 6 shows a schematic circuit diagram of a clock gating circuit according to a first embodiment of the present disclosure. Referring to FIG. 3, a clock gating circuit 230 and an edge-triggered flip-flop 110 together constitute a flip-flop unit, and the clock gating circuit 230 provides a clock signal CK to the edge-triggered flip-flop 110.

The clock gating circuit 230 includes a NOT gate 231 and an OR gate 232. In the clock gating circuit 230, the clock signal CK is a logical OR operation result of a clock signal CLK and an inverted signal EN_a of a clock control signal EN.

The OR gate 232 includes a first input terminal, a second input terminal, and an output terminal. The NOT gate 231 includes an input terminal and an output terminal. The OR gate 232 receives the clock signal CLK at the first input terminal, with the second input terminal being coupled to the output terminal of the NOT gate 231 and receiving the inverted signal EN_a of the clock control signal EN via the NOT gate 231. The OR gate 232 provides the clock signal CK at the output terminal.

In this embodiment, a rising-edge-triggered flip-flop will be taken as an example for illustration, while the clock control signal EN indicates a valid state with a high level and an invalid state with a low level. Each clock cycle of the clock signal CLK includes a first-level phases T1 and a second-level phases T2 successively between adjacent rising edges. The first-level phase T1 and the second-level phase T2 have a high level and a low level, respectively. The clock signal CK provides a triggering edge of the edge-triggered flip-flop 110 at which the edge-triggered flip-flop 110 transmits the input data from the input terminal to the output terminal.

In this embodiment, each of the input data Di and the clock control signal EN has signal delay Td with respect to an edge of the clock signal. A range between a minimum delay Tdmin and a maximum delay Tdmax of the signal delay Td is hatched, respectively. The signal delay Td of the clock control signal EN varies between the minimum delay Tdmin and the maximum delay Tdmax.

Figure 7A:
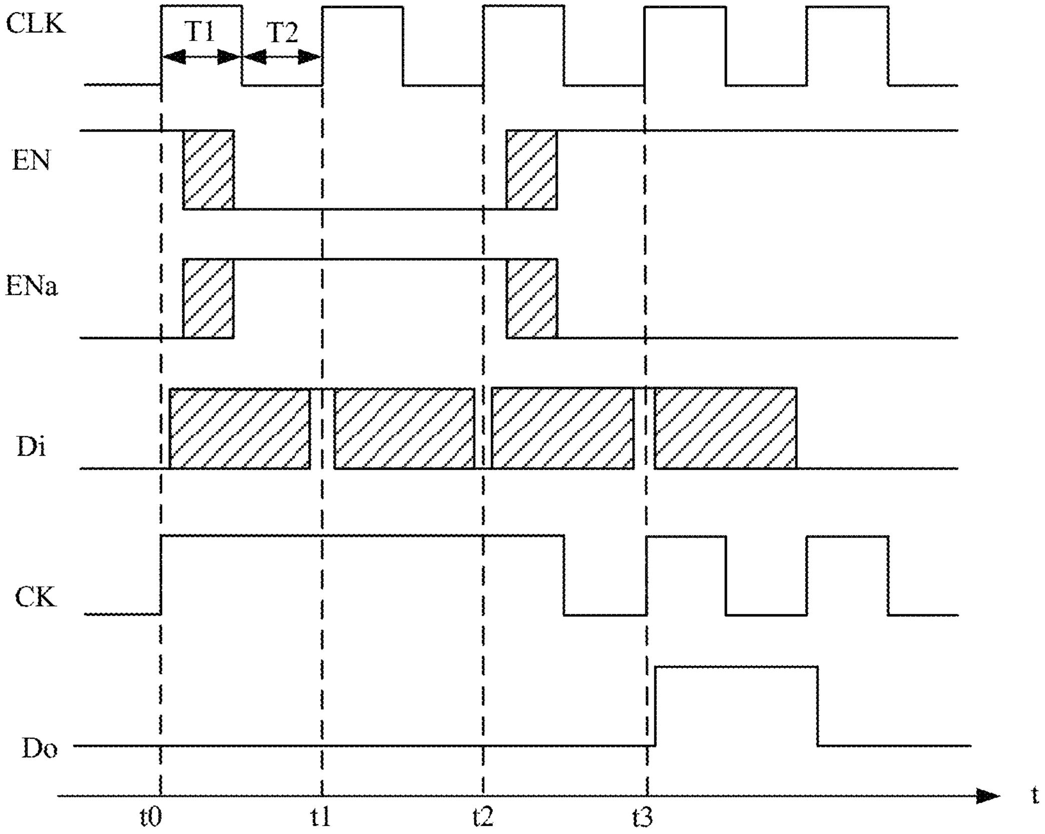

Referring to FIG. 7*a*, the minimum delay Tdmin and the maximum delay Tdmax of the clock control signal EN both occur in the first-level phase T1, and the flipping of the clock control signal EN can only occur in the first-level phase T1 of the clock signal CLK. The starting edge of the first-level phase T1 is a rising edge.

At time t0, the clock signal CLK reaches a rising edge that comes first and the clock control signal EN is valid. In one clock cycle after time t0, the clock control signal EN is flipped from a valid state to an invalid state. The clock signal CK is the result of a logical OR operation of the clock signal CLK and the inverted signal EN_a. At the first-level phase T1 of the clock signal CLK, the clock signal CK is always at a high level. At the second-level phase T2 of the clock signal CLK, the clock signal CK is always at a high level. Therefore, if the signal delay Td of the clock control signal EN is less than or equal to the first-level phase T1 of the clock signal CLK, the clock signal CK is maintained at the high level in the clock cycle during which the clock control signal is flipped from a valid state to an invalid state.

Therefore, in a case that the signal delay Td of the clock control signal EN is less than or equal to the first-level phase T1 of the clock signal CLK, in one clock cycle after time t0, the clock gating circuit 230 disables the clock signal CLK but provides a rising edge of the clock signal CK. The signal level of the output data Do provided by the edge-triggered flip-flop 110 corresponds to the signal level of the input data Di at time to, for example, a low level as shown in FIG. 7*a*, when the setup time elapses after the rising edge.

At time t1, the clock signal CLK reaches a second rising edge and the clock control signal EN is invalid. In one clock cycle after time t1, the clock control signal EN is maintained to be invalid, for example, a low level as shown in FIG. 7*a*. The clock signal CK is the result of a logical OR operation of the clock signal CLK and the inverted signal EN_a. In this clock cycle, since the clock control signal EN is always low, the inverted signal EN_a is always high, and the result of the OR operation, that is, the clock signal CK, is also always high. The clock signal CK does not provide a rising edge. The signal level of the output data Do of the edge-triggered flip-flop 110 corresponds to the signal level in the previous clock cycle, for example, a low level as shown in FIG. 7*a*.

At time t2, the clock signal CLK reaches a third rising edge and the clock control signal EN is invalid. In one clock cycle after time t2, the clock control signal EN is flipped from an invalid state to a valid state. The clock signal CK is the result of a logical OR operation of the clock signal CLK and the inverted signal EN_a. At the first-level phase T1 of the clock signal CLK, the clock signal CK is always at a high level. At the second-level phase T2 of the clock signal CLK, the clock signal CK is always at the low level. Thus, if the signal delay Td of the clock control signal EN is less than or equal to the first-level phase T1 of the clock signal CLK, the clock signal CK is a replica of the clock signal CLK in the clock cycle during which the clock control signal is flipped from an invalid state to a valid state.

Therefore, in a case that the signal delay Td of the clock control signal EN is less than or equal to the first-level phase T1 of the clock signal CLK, in one clock cycle from the time t2, the clock gating circuit 230 copies the clock signal CLK as the clock signal CK but does not provide a rising edge of the clock signal. The signal level of the output data Do of the edge-triggered flip-flop 110 corresponds to the signal level in the previous clock cycle, for example, a low level as shown in FIG. 7*a*.

Furthermore, at time t3, the clock signal CLK reaches a fourth rising edge. The clock control signal EN is valid in the entire clock cycle following time t3, and the clock signal CK is a replica of the clock signal CLK. The clock gating circuit 230 copies the clock signal CLK as the clock signal CK and provides a rising edge of the clock signal CK, so that the clock signal and data transmission of the edge-triggered flip-flop can be enabled. The signal level of the output data Do provided by the edge-triggered flip-flop 110 corresponds to the signal level of the input data Di at time t3, that is, a high level, when the setup time elapses after the rising edge. After time t3, the clock control signal EN may be maintained to be valid, and the clock signal CK is a replica of the clock signal CLK. The edge-triggered flip-flop 110 receives the input data at the data input terminal and transmits the input data to the data output terminal at the triggering edge of the second clock signal when the clock signal CLK is flipped.

Figure 7B:
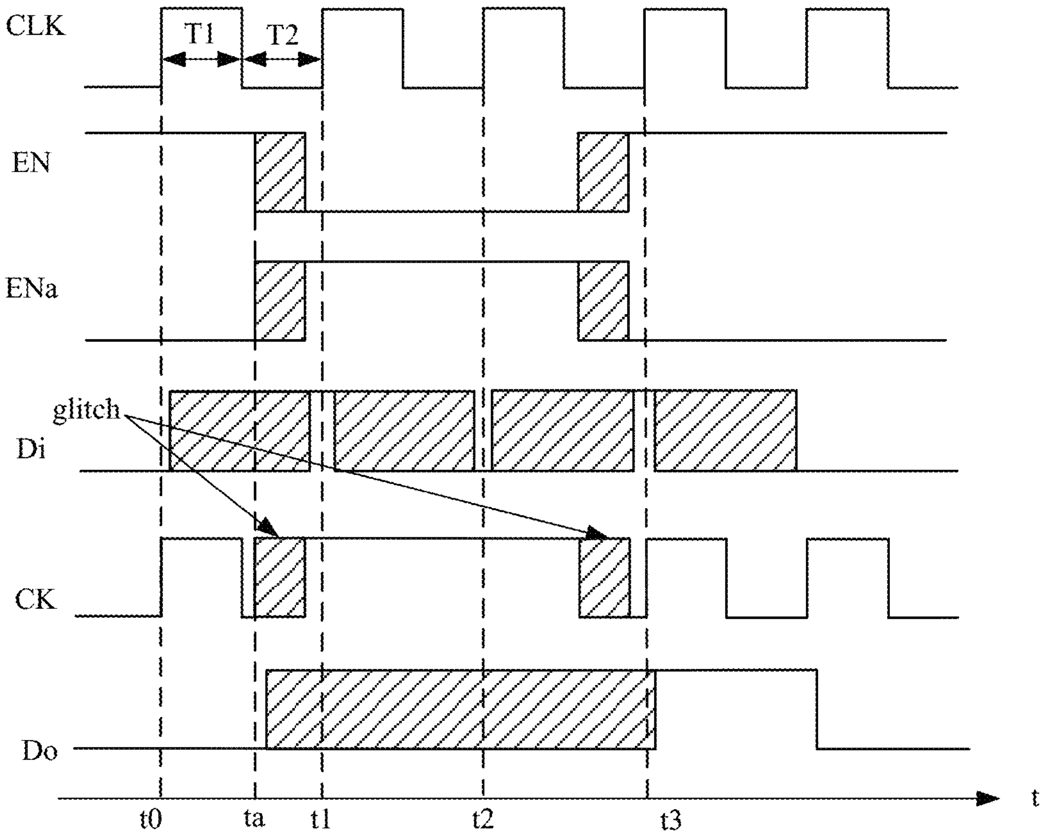

Referring to FIG. 7*b*, the minimum delay Tdmin and the maximum delay Tdmax of the clock control signal EN both occur during the second-level phase T2, and the flipping of the clock control signal EN can only occur during the second-level phase T2 of the clock signal CLK. The starting edge of the second-level phase T2 is a falling edge.

At time t0, the clock signal CLK reaches a rising edge that comes first and the clock control signal EN is valid. In one clock cycle after time t0, the clock control signal EN is flipped from a valid state to an invalid state. The clock signal CK is the result of a logical OR operation of the clock signal CLK and the inverted signal EN_a. At the first-level phase T1 of the clock signal CLK, the clock signal CK is always at a high level. At the second-level phase T2 of the clock signal CLK, the signal level of the clock signal CK depends on the signal delay of the clock control signal EN. If the signal delay Td of the clock control signal EN is greater than the first-level phase T1 of the clock signal CLK, the clock signal CK is flipped from a high level to a low level at the beginning of the second-level phase T2 of the clock signal CLK, and is flipped from a low level to a high level at some time after the time ta at the second-level phase T2 of the clock signal CLK, and then may be repeatedly flipped. Thus, a glitch may occur.

Therefore, in a case that the signal delay Td of the clock control signal EN is greater than the first-level phase T1 of the clock signal CLK, a glitch occurs in the clock signal CK generated by the clock gating circuit 230 in one clock cycle after time t0. The glitch provides an additional rising edge that varies with the clock control signal EN, and the edge-triggered flip-flop 110 provides the output data Do with a signal level which corresponds to the signal level of the input data Di at the additional rising edge, when the setup time elapses after the additional rising edge. On the one hand, the input data Di of the edge-triggered flip-flop 110 has an uncertain state due to its own signal delay. On the other hand, the additional rising edge provided by the glitch in the clock signal CK overlaps the uncertain state of the input data Di. Therefore, after the setup time elapses after the additional rising edge, the output data Do provided by the edge-triggered flip-flop 110 corresponds to the signal level of the additional rising edge, e.g., the uncertain state as shown FIG. 7*b*.

At time t1, the clock signal CLK reaches a second rising edge and the clock control signal EN is invalid. As in FIG. 7*a*, the clock signal CK is maintained at a high level in one clock cycle after time t1, providing neither a rising edge nor a falling edge. The signal level of the output data Do of the edge-triggered flip-flop 110 corresponds to the signal level in the previous clock cycle, for example, the uncertain state shown in FIG. 7*b*.

At time t2, the clock signal CLK reaches a third rising edge and the clock control signal EN is invalid. In one clock cycle after time t2, the clock control signal EN is flipped from an invalid state to a valid state. The clock signal CK is the result of a logical OR operation of the clock signal CLK and the inverted signal EN_a. At the first-level phase T1 of the clock signal CLK, the clock signal CK is always at a high level. At the second-level phase T2 of the clock signal CLK, the signal level of the clock signal CK depends on the signal delay of the clock control signal EN. If the signal delay Td of the clock control signal EN is greater than the first-level phase T1 of the clock signal CLK, the clock signal CK is flipped from a high level to a low level at the second-level phase T2 of the clock signal CLK at the same time as the flipping of the clock control signal EN. Thus, a glitch may occur.

Therefore, in a case that the signal delay Td of the clock control signal EN is greater than the first-level phase T1 of the clock signal CLK, a glitch occurs in the clock signal CK generated by the clock gating circuit 230 in one clock cycle after time t2. However, the glitch can only provide an additional falling edge that varies with the clock control signal EN, and may provide a triggering edge of the edge-triggered flip-flop 110 due to the flipping. Therefore, the signal level of the output data Do of the edge-triggered flip-flop 110 corresponds to the signal level in the previous clock cycle, for example, the uncertain state shown in FIG. 7*b*.

Furthermore, at time t3, the clock signal CLK reaches a fourth rising edge. The clock control signal EN is valid in the entire clock cycle following time t3, and the clock signal CK is a replica of the clock signal CLK. The clock gating circuit 230 copies the clock signal CLK as the clock signal CK and provides a rising edge of the clock signal CK, so that the clock signal and data transmission of the edge-triggered flip-flop can be enabled. The signal level of the output data Do provided from the edge-triggered flip-flop 110 corresponds to the signal level of the input data Di at time t3, that is, a high level, when the setup time elapses after the rising edge. After time t3, the clock control signal EN may be maintained to be valid, and the clock signal CK is a replica of the clock signal CLK. The edge-triggered flip-flop 110 receives the input data at the data input terminal and transmits the input data to the data output terminal at the triggering edge of the second clock signal when the clock signal CLK is flipped.

The clock gating circuit 230 described above has different circuit characteristics under different delay conditions of the clock control signal EN. Under the condition that both the minimum delay Tdmin and the maximum delay Tdmax of the clock control signal EN fall within the first-level phase T1 and the starting edge of the first-level phase T1 is a rising edge, the clock gating circuit 230 shown in FIG. 6 is selected to replace the clock gating circuit 130 shown in FIG. 4.

The clock gating circuit 230 copies the clock signal CLK as a clock signal CK, which is provided to the clock input terminal of the edge-triggered flip-flop 110, in clock cycles during which the clock control signal EN is maintained to be valid, and disables the clock signal CLK in clock cycles during which the clock control signal EN is maintained to be invalid. Accordingly, the clock flipping and the data transmission of the edge-triggered flip-flop 110 may be disabled by the clock gating circuit 230.

The clock gating circuit 230 disables the clock signal CLK and maintains the clock signal CK at a predetermined level in a clock cycle during which the clock control signal EN is flipped from a valid state to an invalid state. In such a case, the clock signal CK still provides the triggering edge of the edge-triggered flip-flop 110. The clock gating circuit 230 allows the data transmission of the edge-triggered flip-flop 110, and the output data Do provided by the edge-triggered flip-flop 110 is the input data Di at the current triggering edge. The clock gating circuit 230 disables the clock flipping of the edge-triggered flip-flop 110, thereby reducing the dynamic power consumption of the edge-triggered flip-flop 110 due to the flipping of the clock signal CK.

The clock gating circuit 230 copies the clock signal CLK as the clock signal CK in the clock cycle during which the clock control signal EN is flipped from an invalid state to a valid state, thereby allowing the clock of the edge-triggered flip-flop 110 to be flipped. In such a case, the clock signal CK fails to provide a triggering edge of the edge-triggered flip-flop 110, the clock gating circuit 230 disables the data transmission of the edge-triggered flip-flop 110, and the edge-triggered flip-flop 110 maintains the input data Di at the previous triggering edge, thereby reducing the dynamic power consumption of the edge-triggered flip-flop 110 due to the data transmission.

The timing requirement of the clock gating circuit 230 for the clock control signal EN is that the flipping of the clock control signal EN occurs at one-level phase, in this embodiment, the first-level phase T1, after the triggering edge of one clock cycle of the clock signal CLK. If it is desired to disable the data transmission at a predetermined time, the flipping of the clock control signal EN from a valid state to an invalid state may be completed at the first-level phase T1 of the last entire clock cycle just before the predetermined time, and the flipping of the clock control signal EN from an invalid state to a valid state may be completed at the first-level phase T1 of the clock signal CLK of the last clock cycle after the predetermined time.

Compared with the clock gating circuit 130 shown in FIG. 4, the clock gating circuit 230 according to the present embodiment omits the latch, uses less hardware logic, and has lower operating power consumption. In the flip-flop unit, any number of edge-triggered flip-flops 110 may share the clock gating circuit 230 to form a flip-flop group. In a case that the flip-flop group includes any number of edge-triggered flip-flops 110, the increased power consumption due to the power consumption of the clock gating circuit 230 itself is much less than the reduced power consumption of the edge-triggered flip-flops 110 by clock gating. Thus, the flip-flop unit can always achieve the power consumption reduction.

Figure 8:
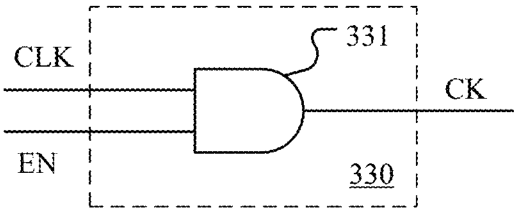
FIGS. 8 and 9*a*, 9*b* show a schematic circuit diagram and a waveform diagram, respectively, of a clock gating circuit according to a second embodiment of the present disclosure.

FIG. 8 shows a schematic circuit diagram of a clock gating circuit according to a second embodiment of the present disclosure. Referring to FIG. 3, the clock gating circuit 330 and the edge-triggered flip-flop 110 together constitute a flip-flop unit, and the clock gating circuit 330 provides a clock signal CK to the edge-triggered flip-flop 110.

The clock gating circuit 330 includes an AND gate 331. In the clock gating circuit 330, the clock signal CK is a logical AND operation result of the clock signal CLK and the clock control signal EN.

The AND gate 331 includes a first input terminal, a second input terminal, and an output terminal. The AND gate 331 receives the clock signal CLK at the first input terminal, receives the clock control signal EN at the second input terminal, and provides the clock signal CK at the output terminal.

In this embodiment, a falling-edge-triggered flip-flop will be taken as an example for illustration, while the clock control signal EN indicates a valid state with a high level and an invalid state with a low level. Each clock cycle of the clock signal CLK includes a first-level phase T1 and a second-level phase T2 successively between adjacent falling edges. The first-level phase T1 and the second-level phase T2 have a low level and a high level, respectively. The clock signal CK provides a triggering edge of the edge-triggered flip-flop 110 at which the edge-triggered flip-flop 110 transmits the input data from the input terminal to the output terminal.

In this embodiment, each of the input data Di and the clock control signal EN has signal delay Td with respect to an edge of the clock signal. A range between a minimum delay Tdmin and a maximum delay Tdmax of the signal delay Td is hatched, respectively. The signal delay Td of the clock control signal EN varies between the minimum delay Tdmin and the maximum delay Tdmax.

Figure 9A:
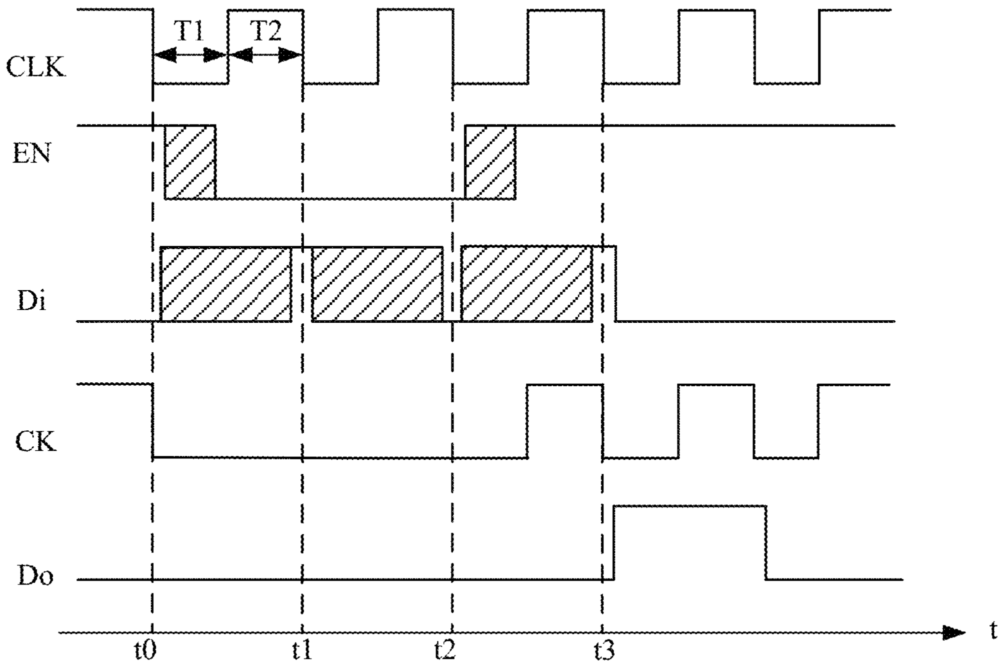

Referring to FIG. 9*a*, the minimum delay Tdmin and the maximum delay Tdmax of the clock control signal EN both occur in the first-level phase T1, and the flipping of the clock control signal EN can only occur at the first-level phase T1 of the clock signal CLK. The starting edge of the first-level phase T1 is a falling edge.

At time t0, the clock signal CLK reaches a first falling edge and the clock control signal EN is valid. In one clock cycle after time t0, the clock control signal EN is flipped from a valid state to an invalid state. The clock signal CK is a logical AND operation result of the clock signal CLK and the clock control signal EN. At the first-level phase T1 of the clock signal CLK, the clock signal CK is always at a low level. At the second-level phase T2 of the clock signal CLK, the clock signal CK is always at the low level. Therefore, if the signal delay Td of the clock control signal EN is less than or equal to the first-level phase T1 of the clock signal CLK, the clock signal CK is maintained at the low level in the clock cycle during which the clock control signal is flipped from a valid state to an invalid state.

Therefore, in a case that the signal delay Td of the clock control signal EN is less than or equal to the first-level phase T1 of the clock signal CLK, in one clock cycle after time t0, the clock gating circuit 330 disables the clock signal CLK but provides a falling edge of the clock signal CK. The signal level of the output data Do provided by the edge-triggered flip-flop 110 corresponds to the signal level of the input data Di at time t0, for example, a low level as shown in FIG. 9*a*, when the setup time elapses after the falling edge.

At time t1, the clock signal CLK reaches a second falling edge and the clock control signal EN is invalid. In one clock cycle after time t1, the clock control signal EN is maintained to be invalid, for example, a low level as shown in FIG. 9*a*. The clock signal CK is a logical AND operation result of the clock signal CLK and the clock control signal EN. In this clock cycle, since the clock control signal EN is always low, the result of the logical AND operation, that is, the clock signal CK, is also always low. The clock signal CK does not provide a falling edge. The signal level of the output data Do of the edge-triggered flip-flop 110 corresponds to the signal level in the previous clock cycle, for example, a low level as shown in FIG. 9*a*.

At time t2, the clock signal CLK reaches a third falling edge and the clock control signal EN is invalid. In one clock cycle after time t2, the clock control signal EN is flipped from an invalid state to a valid state. The clock signal CK is a logical AND operation result of the clock signal CLK and the clock control signal EN. At the first-level phase T1 of the clock signal CLK, the clock signal CK is always at a low level. At the second-level phase T2 of the clock signal CLK, the clock signal CK is always at a high level. Thus, if the signal delay Td of the clock control signal EN is less than or equal to the first-level phase T1 of the clock signal CLK, the clock signal CK is a replica of the clock signal CLK in the clock cycle during which the clock control signal is flipped from an invalid state to a valid state.

Therefore, in a case that the signal delay Td of the clock control signal EN is less than or equal to the first-level phase T1 of the clock signal CLK, in one clock cycle from the time t2, the clock gating circuit 330 copies the clock signal CLK as the clock signal CK but does not provide a falling edge of the clock signal. The signal level of the output data Do of the edge-triggered flip-flop 110 corresponds to the signal level in the previous clock cycle, for example, a low level as shown in FIG. 9*a*.

Furthermore, at time t3, the clock signal CLK reaches a fourth falling edge. The clock control signal EN is valid in the entire clock cycle following time t3, and the clock signal CK is a replica of the clock signal CLK. The clock gating circuit 330 copies the clock signal CLK as the clock signal CK and provides a falling edge of the clock signal CK, so that the clock signal and data transmission of the edge-triggered flip-flop can be enabled. The signal level of the output data Do provided by the edge-triggered flip-flop 110 corresponds to the signal level of the input data Di at time t3, that is, a high level, when the setup time elapses after the falling edge. After time t3, the clock control signal EN may be maintained to be valid, and the clock signal CK is a replica of the clock signal CLK. The edge-triggered flip-flop 110 receives the input data at the data input terminal and transmits the input data to the data output terminal at the triggering edge of the second clock signal when the clock signal CLK is flipped.

Figure 9B:
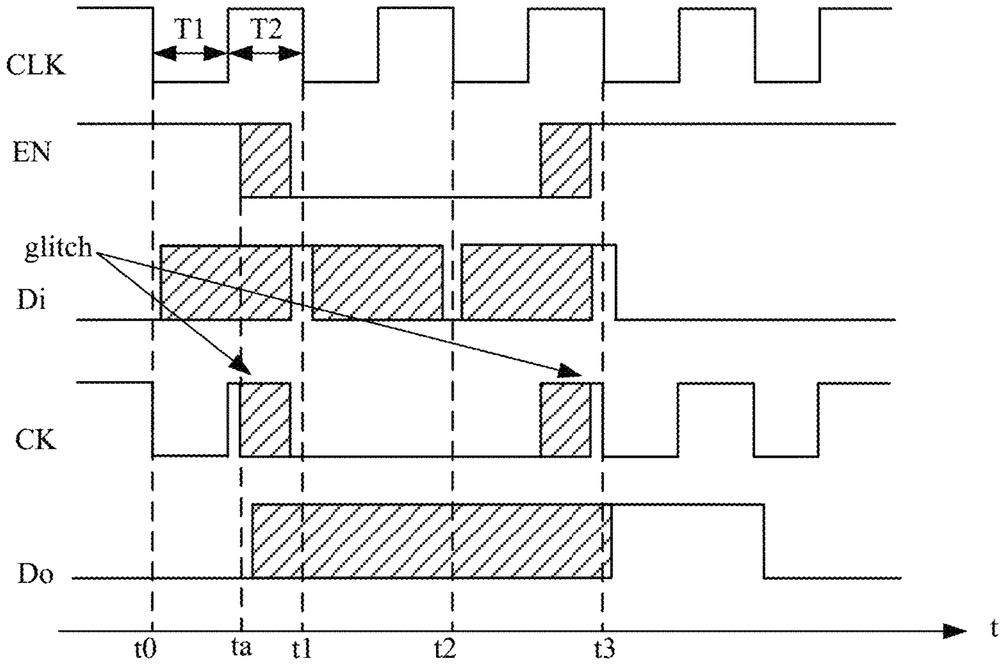

Referring to FIG. 9*b*, the minimum delay Tdmin and the maximum delay Tdmax of the clock control signal EN both occur in the second-level phase T2, and the flipping of the clock control signal EN can only occur at the second-level phase T2 of the clock signal CLK. The starting edge of the second-level phase T2 is a rising edge.

At time t0, the clock signal CLK reaches a first falling edge and the clock control signal EN is valid. In one clock cycle after time t0, the clock control signal EN is flipped from a valid state to an invalid state. The clock signal CK is a logical AND operation result of the clock signal CLK and the clock control signal EN. At the first-level phase T1 of the clock signal CLK, the clock signal CK is always at a low level. At the second-level phase T2 of the clock signal CLK, the signal level of the clock signal CK depends on the signal delay of the clock control signal EN. If the signal delay Td of the clock control signal EN is greater than the first-level phase T1 of the clock signal CLK, the clock signal CK is flipped from a low level to a high level at the beginning of the second-level phase T2 of the clock signal CLK, and is flipped from a high level to a low level at some time after time ta at the second-level phase T2 of the clock signal CLK, and then may be repeatedly flipped. Thus, a glitch may occur.

Therefore, in a case that the signal delay Td of the clock control signal EN is greater than the first-level phase T1 of the clock signal CLK, a glitch occurs in the clock signal CK generated by the clock gating circuit 330 in one clock cycle after time t0. The glitch provides an additional falling edge that varies with the clock control signal EN, and the edge-triggered flip-flop 110 provides the output data Do with a signal level which corresponds to the signal level of the input data Di at the additional falling edge, when the setup time elapses after the falling edge. On the one hand, the input data Di of the edge-triggered flip-flop 110 has an uncertain state due to its own signal delay. On the other hand, the additional falling edge provided by the glitch in the clock signal CK overlaps the uncertain state of the input data Di. Therefore, the output data Do provided by the edge-triggered flip-flop 110 corresponds to the signal level of the additional falling edge, e.g., the uncertain state as shown FIG. 9*b*, when the setup time elapses after the additional falling edge.

At time t1, the clock signal CLK reaches a second falling edge and the clock control signal EN is invalid. As in FIG. 9*a*, the clock signal CK is maintained at a low level in one clock cycle after time t1, providing neither a rising edge nor a falling edge. The signal level of the output data Do of the edge-triggered flip-flop 110 corresponds to the signal level in the previous clock cycle, for example, the uncertain state shown in FIG. 9*b*.

At time t2, the clock signal CLK reaches a third falling edge and the clock control signal EN is invalid. In one clock cycle after time t2, the clock control signal EN is flipped from an invalid state to a valid state. The clock signal CK is a logical AND operation result of the clock signal CLK and the clock control signal EN. At the first-level phase T1 of the clock signal CLK, the clock signal CK is always at a low level. At the second-level phase T2 of the clock signal CLK, the signal level of the clock signal CK depends on the signal delay of the clock control signal EN. If the signal delay Td of the clock control signal EN is greater than the first-level phase T1 of the clock signal CLK, the clock signal CK is flipped from the low level state to the high level state at the second-level phase T2 of the clock signal CLK at the same time as the flipping of the clock control signal EN. Thus, a glitch may occur.

Therefore, in a case that the signal delay Td of the clock control signal EN is greater than the first-level phase T1 of the clock signal CLK, a glitch occurs in the clock signal CK generated by the clock gating circuit 330 in one clock cycle after time t2. However, the glitch can only provide an additional rising edge that varies with the clock control signal EN, and may provide a triggering edge of the edge-triggered flip-flop 110 due to the flipping. Therefore, the signal level of the output data Do of the edge-triggered flip-flop 110 corresponds to the signal level in the previous clock cycle, for example, the uncertain state shown in FIG. 9*b*.

Furthermore, at time t3, the clock signal CLK reaches a fourth falling edge. The clock control signal EN is valid in the entire clock cycle following time t3, and the clock signal CK is a replica of the clock signal CLK. The clock gating circuit 330 copies the clock signal CLK as the clock signal CK and provides a falling edge of the clock signal CK, so that the clock signal and data transmission of the edge-triggered flip-flop can be enabled. The signal level of the output data Do provided by the edge-triggered flip-flop 110 corresponds to the signal level of the input data Di at time t3, that is, a high level, when the setup time elapses after the falling edge. After time t3, the clock control signal EN may be maintained to be valid, and the clock signal CK is a replica of the clock signal CLK. The edge-triggered flip-flop 110 receives the input data at the data input terminal and transmits the input data to the data output terminal at the triggering edge of the second clock signal when the clock signal CLK is flipped.

The clock gating circuit 330 described above has different circuit characteristics under different delay conditions of the clock control signal EN. Under the condition that both the minimum delay Tdmin and the maximum delay Tdmax of the clock control signal EN fall within the first-level phase T1 and the starting edge of the first-level phase T1 is a falling edge, the clock gating circuit 330 shown in FIG. 8 is selected to replace the clock gating circuit 130 shown in FIG. 4.

The clock gating circuit 330 copies the clock signal CLK as a clock signal CK, which is provided to the clock input terminal of the edge-triggered flip-flop 110, in clock cycles during which the clock control signal EN is maintained to be valid, and disables the clock signal CLK in clock cycles during which the clock control signal EN is maintained to be invalid. Accordingly, the clock flipping and the data transmission of the edge-triggered flip-flop 110 may be disabled by the clock gating circuit 330.

The clock gating circuit 330 disables the clock signal CLK and maintains the clock signal CK at a predetermined level in a clock cycle during which the clock control signal EN is flipped from a valid state to an invalid state. In such a case, the clock signal CK still provides the triggering edge of the edge-triggered flip-flop 110. The clock gating circuit 330 allows the data transmission of the edge-triggered flip-flop 110, and the output data Do provided by the edge-triggered flip-flop 110 is the input data Di at the current triggering edge. The clock gating circuit 330 disables the clock flipping of the edge-triggered flip-flop 110, thereby reducing the dynamic power consumption of the edge-triggered flip-flop 110 due to the flipping of the clock signal CK.

In the clock cycle during which the clock control signal EN is flipped from an invalid state to a valid state, the clock gating circuit 330 copies the clock signal CLK as the clock signal CK, thus allowing the clock flipping of the edge-triggered flip-flop 110. In such a case, the clock signal CK fails to provide a triggering edge of the edge-triggered flip-flop 110, the clock gating circuit 330 disables the data transmission of the edge-triggered flip-flop 110, and the edge-triggered flip-flop 110 maintains the input data Di at the previous triggering edge, thereby reducing the dynamic power consumption of the edge-triggered flip-flop 110 due to the data transmission.

The timing requirement of the clock gating circuit 330 for the clock control signal EN is that the flipping of the clock control signal EN occurs at one-level phase, in this embodiment, the first-level phase T1, after the triggering edge of one clock cycle of the clock signal CLK. If it is desired to disable the data transmission at a predetermined time, the flipping of the clock control signal EN from a valid state to an invalid state may be completed at the first-level phase T1 of the last entire clock cycle just before the predetermined time, and the flipping of the clock control signal EN from an invalid state to a valid state may be completed at the first-level phase T1 of the clock signal CLK of the last clock cycle after the predetermined time.

Compared to the clock gating circuit 130 shown in FIG. 4, the clock gating circuit 330 according to the present embodiment omits the latch, uses less hardware logic, and operates with lower power consumption. In a flip-flop unit, any number of edge-triggered flip-flops 110 may share the clock gating circuit 330 to form a flip-flop group. In a case that the flip-flop group includes any number of edge-triggered flip-flops 110, the increased power consumption due to the power consumption of the clock gating circuit 330 itself is much less than the reduced power consumption of the edge-triggered flip-flops 110 by clock gating. Thus, the flip-flop unit can always achieve the power consumption reduction.

Figure 10:
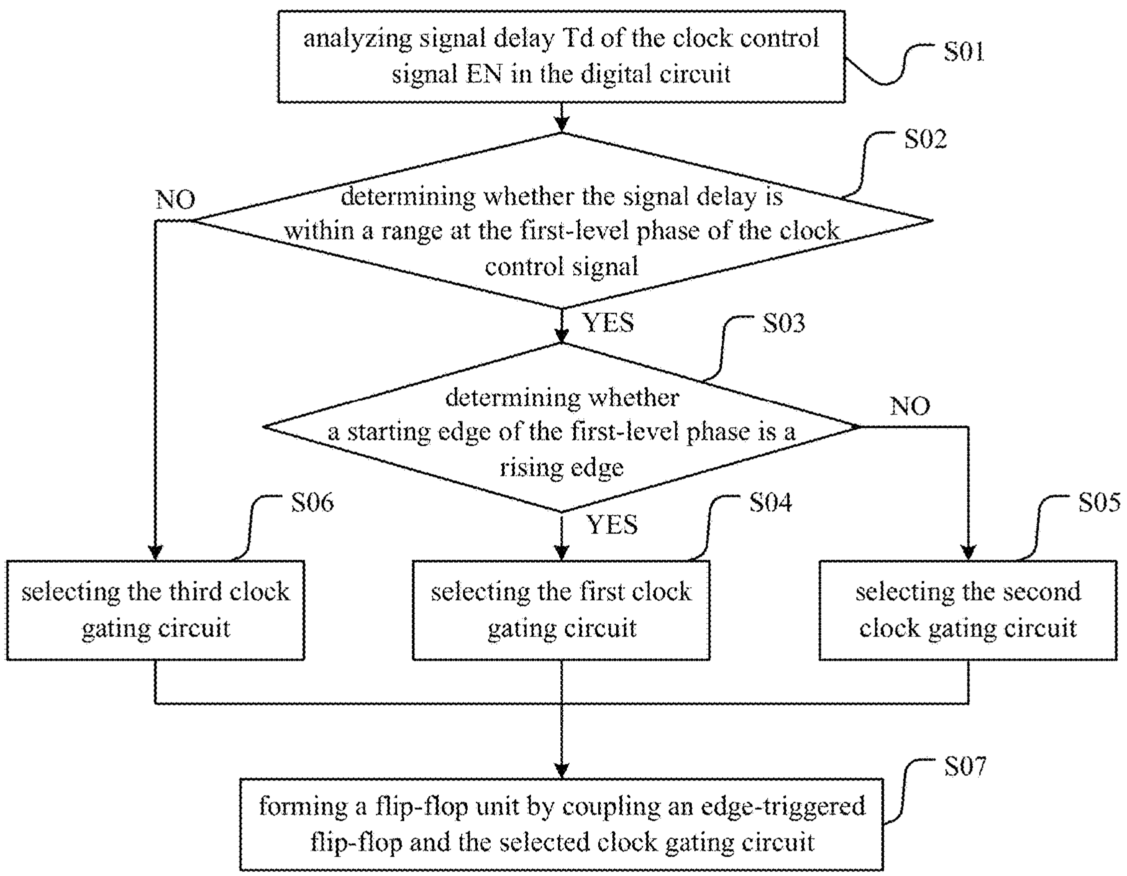
FIG. 10 shows a flowchart of a design method for a flip-flop unit according to a third embodiment of the present disclosure.

FIG. 10 shows a flowchart of a design method for a flip-flop unit according to a third embodiment of the present disclosure.

The flip-flop unit design method includes steps S01 to S07.

In step S01, signal delay Td of the clock control signal EN is analyzed in the digital circuit.

The signal delay of the clock control signal EN is the operation time required from the start of the operation at a clock edge to the stable flipping of the clock control signal when the digital circuit generates the clock control signal. Most of the conventional EDA tools can obtain the signal delay Td of the clock control signal EN. The signal delay Td varies, for example, within a range between a minimum delay Tdmin and a maximum delay Tdmax.

Then, the clock gating circuit is selected for the edge-triggered flip-flop among a plurality of types of clock gating circuits according to the signal delay Td of the clock control signal EN.

According to the signal delay Td of the clock control signal EN, the plurality of types of clock gating circuits are candidates and selected for application of the the edge-triggered flip-flop to realize a better low power consumption solution. The clock gating circuit performs a logical operation on the clock control signal EN and the clock signal CLK to generate the clock signal CK.

Each clock cycle of the clock signal CLK includes a first-level phase T1 and a second-level phase T2 successively, and having a first level and a second level opposite to each other, respectively. When the first level is high, the starting edge of the first-level phase T1 is a rising edge, and when the first level is low, the starting edge of the first-level phase T1 is a falling edge.

In step S02, it is determined whether the signal delay is within a range at the first-level phase of the clock control signal.

In this step, one of the first clock gating circuit and the second clock gating circuit is selected according to the delay condition of the clock control signal EN.

The signal delay Td of the clock control signal EN varies between the minimum delay Tdmin and the maximum delay Tdmax. The minimum delay Tdmin and the maximum delay Tdmax of the clock control signal EN are compared with the first-level phase T1 of the clock signal CLK to determine whether the signal delay of the clock control signal EN is within a range at the first-level phase of the clock control signal.

If the signal delay Td of the clock control signal EN meets the following conditions: Tdmin<T1, Tdmax<T1, the signal delay of the clock control signal EN falls within the range at the first-level phase. In such a case, the flipping of the clock control signal EN can only occur in a single-level phase of the clock signal CLK. Further, step S03 is performed to select one of the first clock gating circuit shown in FIG. 6 and the second clock gating circuit shown in FIG. 8.

If the signal delay Td of the clock control signal EN meets the following conditions: Tdmin<T1, Tdmax>T1, the signal delay of the clock control signal EN falls within the range in a time period in which the first-level phase and the second-level phase are adjacent to each other. In such a case, the flipping of the clock control signal EN may occur at any-level phase of the clock signal CLK. Further, step S06 is performed to select the third clock gating circuit shown in FIG. 4.

In step S03, the starting edge of the first-level phase is further determined.

In this step, one of the first clock gating circuit and the second clock gating circuit is selected according to the starting edge of the first-level phase T1.

If the starting edge of the first-level phase T1 is a rising edge, step S04 is performed to select the first clock gating circuit as shown in FIG. 6.

As described above, in the clock gating circuit shown in FIG. 6, the clock signal CK of the clock gating circuit disables the clock signal CLK but provides the rising edge of the clock signal CK in the clock cycle during which the clock control signal EN is flipped from a valid state to an invalid state. The clock gating circuit copies the clock signal CLK as the clock signal CK but does not provide a rising edge of the clock signal CLK in the clock cycle during which the clock control signal EN is flipped from an invalid state to a valid state. Therefore, providing that the clock control signal EN is flipped in the first-level phase T1 of the clock signal CLK and the starting edge of the first-level phase T1 is a rising edge, the glitch in the clock signal of the edge-triggered flip-flop can be eliminated, so that the edge-triggered flip-flop can operate normally.

If the starting edge of the first-level phase T1 is a falling edge, step S05 is performed to select the second clock gating circuit as shown in FIG. 8.

As described above, in the clock gating circuit shown in FIG. 8, the clock signal CK of the clock gating circuit disables the clock signal CLK but provides a falling edge of the clock signal CK in a clock cycle during which the clock control signal EN is flipped from a valid state to an invalid state. The clock gating circuit copies the clock signal CLK as the clock signal CK but does not provide a falling edge of the clock signal in a clock cycle during which the clock control signal EN is flipped from an invalid state to a valid state. Therefore, providing that the clock control signal EN is flipped in the first-level phase T1 of the clock signal CLK and the starting edge of the first-level phase T1 is a falling edge, the glitch in the clock signal of the edge-triggered flip-flop can be eliminated, so that the edge-triggered flip-flop can operate normally.

In step S06, the third clock gating circuit shown in FIG. 4 is selected.

As described above, the clock gating circuit shown in FIG. 4 includes a latch, which can eliminate the glitch in the clock signal of the edge-triggered flip-flop no matter whether the clock control signal EN is flipped in the first-level phase T1 or the second-level phase T2 of the clock signal CLK, so that the edge-triggered flip-flop can operate normally.

In step S07, at least one edge-triggered flip-flop and the selected clock gating circuit are coupled to be a flip-flop unit.

For example, an output terminal of the selected clock gating circuit is coupled to a clock input terminal of the at least one edge-triggered flip-flop to constitute a flip-flop unit.

Figure 11:
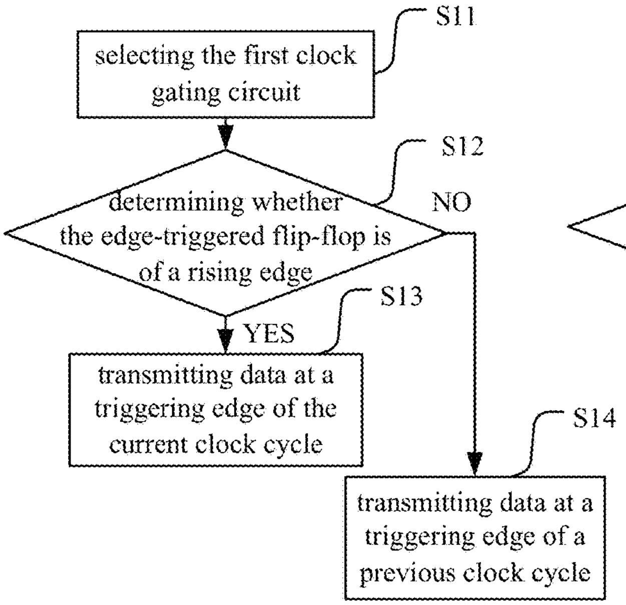
FIG. 11 shows a combination of a clock gating circuit and an edge-triggered flip-flop in the design method for the flip-flop unit as shown in FIG. 10.

FIG. 11 shows a combination of a clock gating circuit and an edge-triggered flip-flop in the design method for the flip-flop unit as shown in FIG. 10.

The first clock gating circuit shown in FIG. 6 is taken as an example for illustration. The clock signal CK of the first clock gating circuit disables the clock signal CLK but provides a rising edge of the clock signal CK during a clock cycle during which the clock control signal EN is flipped from a valid state to an invalid state.

The type of the edge-triggered flip-flop 110 may be classified into a rising-edge-triggered flip-flop and a falling-edge-triggered flip-flop according to a triggering edge of the edge-triggered flip-flop 110. After the type of the clock gating circuit is selected, the edge-triggered flip-flop and the clock gating circuit are coupled to be a flip-flop unit. The first clock gating circuit and the second clock gating circuit may directly generate the second clock signal to provide a triggering edge to any type of edge-triggered flip-flop.

When the selected clock gating circuit and the edge-triggered flip-flop are coupled to be a flip-flop unit, a triggering edge may be determined in view of a triggering mode that corresponds to the type of the edge-triggered flip-flop.

Referring to FIG. 11, a method for forming a flip-flop unit includes steps S11 to S14. The first clock gating circuit is selected in step S11. It is further determined in step S12 whether the selected edge-triggered flip-flop is of a rising edge or a falling edge.

If the edge-triggered flip-flop is a rising-edge-triggered flip-flop, step S13 is performed. In step S13, the rising edge provided by the second clock signal CK generated by the first clock gating circuit in the clock cycle during which the clock control signal EN is flipped from a valid state to an invalid state is used as the triggering edge of the edge-triggered flip-flop, that is, the edge-triggered flip-flop can transmit data at the triggering edge of the current clock cycle during which the clock control signal CK is flipped.

If the edge-triggered flip-flop is a falling-edge-triggered flip-flop, step S14 is performed. In step S14, the first clock gating circuit provides the falling edge of the second clock signal CK generated in the clock cycle before the clock cycle when the clock control signal EN is flipped from a valid state to an invalid state as the triggering edge of the edge-triggered flip-flop, that is, at the triggering edge in the clock cycle before the clock cycle when the clock control signal CK is flipped, the edge-triggered flip-flop can transmit data.

Figure 12:
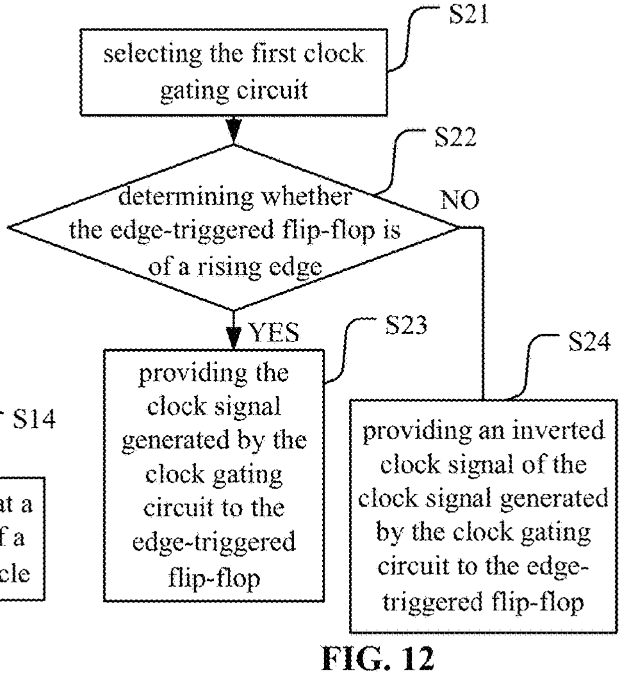
FIG. 12 shows another combination of a clock gating circuit and an edge-triggered flip-flop in the design method for the flip-flop unit as shown in FIG. 10.

FIG. 12 shows a combination of a clock gating circuit and an edge-triggered flip-flop in the design method for the flip-flop unit as shown in FIG. 10.

The first clock gating circuit shown in FIG. 6 is taken as an example for illustration. The clock signal CK of the first clock gating circuit disables the clock signal CLK but provides a rising edge of the clock signal CK during a clock cycle during which the clock control signal EN is flipped from a valid state to an invalid state.

The type of the edge-triggered flip-flop 120 may be classified into a rising-edge-triggered flip-flop and a falling-edge-triggered flip-flop according to a triggering edge of the edge-triggered flip-flop 120. After the type of the clock gating circuit is selected, the edge-triggered flip-flop and the clock gating circuit are coupled to be a flip-flop unit. The first clock gating circuit and the second clock gating circuit may directly generate the second clock signal, invert the second clock signal to generate the third clock signal, and provide a triggering edge to any type of edge-triggered flip-flop.

When the selected clock gating circuit and the edge-triggered flip-flop are coupled to be a flip-flop unit, a triggering edge may be determined in view of a triggering mode that corresponds to the type of the edge-triggered flip-flop.

Referring to FIG. 12, another method of coupling to be a flip-flop unit includes steps S21 to S24. The first clock gating circuit is selected in step S21. It is further determined in step S22 whether the selected edge-triggered flip-flop is of a rising edge or a falling edge.

If the edge-triggered flip-flop is a rising-edge-triggered flip-flop, step S23 is performed. In step S23, the rising edge provided by the second clock signal CK generated by the first clock gating circuit in the clock cycle during which the clock control signal EN is flipped from a valid state to an invalid state is used as the triggering edge of the edge-triggered flip-flop. That is, the edge-triggered flip-flop can transmit data at the triggering edge of the current clock cycle during which the clock control signal CK is flipped.

If the edge-triggered flip-flop is a falling-edge-triggered flip-flop, step S24 is performed. In step S24, the second clock signal is inverted to generate a third clock signal, the first clock gating circuit generates the second clock signal CK in a clock cycle during which the clock control signal EN is flipped from a valid state to an invalid state. The falling edge provided by the inverted signal of the second clock signal CK is used as the triggering edge of the edge-triggered flip-flop. That is, at the triggering edge of the current clock cycle during which the clock control signal CK is flipped, the edge-triggered flip-flop may transmit data.

In the above design method for the flip-flop unit, one of the three clock gating circuits is selected for the edge-triggered flip-flop according to the signal delay of the clock control signal. It is understood that in the design of digital circuits, the clock control signal may be controlled to be flipped only in the first-level phase of the clock signal CLK. Therefore, the clock gating circuit may be selected for the edge-triggered flip-flop from the two clock gating circuits according to the type of the edge-triggered flip-flop.

In the above flip-flop unit, the flip-flop, which is triggered at a rising edge or a falling edge of the clock signal, is taken as an example for illustration. The edge-triggered flip-flop in the flip-flop unit is described with only specific structures. However, the present disclosure is not limited thereto. It is understood that other types of edge-triggered flip-flops, such as an edge-triggered flip-flop with a reset function, is also applicable to the present disclosure to have technical benefits.

It should be noted that, in this document, relational terms such as first and second are used only to distinguish one entity or operation from another, and do not necessarily require or imply the existence of any such actual relationship or order between those entities or operations. Furthermore, the terms "including", "comprising", or any other variant thereof, are intended to cover non-exclusive inclusion, such that a process, method, article, or apparatus comprising a set of elements includes not only those elements, but also other elements not expressly listed, or other elements that are not expressly listed for the purpose of such a process, method, article or apparatus, or other elements that are not expressly listed for the purpose of such a process, method, article or equipment. elements, or also includes elements that are inherent to such process, method, article or apparatus. Without further limitation, the fact that an element is defined by the phrase "includes a . . . " does not preclude the existence of additional identical elements in the process, method, article or apparatus that includes said element.

While embodiments according to the present disclosure are described above, these embodiments are not exhaustive of all details, nor are the disclosure limited to the specific embodiments described. Obviously, many modifications and variations are possible in light of the above description. These embodiments were chosen and described in detail in order to best explain the principles of the disclosure and its practical application, to thereby enable others skilled in the art to best utilize the disclosure and to make modifications of the disclosure. The disclosure is to be limited only by the claims and their full scope and equivalents.

What is claimed is:

1. A design method for a flip-flop unit, comprising:

analyzing signal delay of a clock control signal relative to a first clock signal in a digital circuit;

upon a delay range of the clock control signal being located in a first-level phase of the first clock signal, selecting one of a first clock gating circuit and a second clock gating circuit according to a type of a starting edge of the first-level phase, so as to generate a second clock signal, and coupling at least one edge-triggered flip-flop and the selected clock gating circuit to be the flip-flop unit, the edge-triggered flip-flop transmitting data at an edge of the second clock signal, wherein the first clock gating circuit and the second clock gating circuit maintain the second clock signal at a predetermined level at least in a clock cycle during which the clock control signal flips from a valid state to an invalid state, in a case that the starting edge of the first-level phase is a rising edge, the first clock gating circuit is selected, wherein the first clock gating circuit performs a combinational logic operation comprising at least a logical OR operation on the clock control signal and the first clock signal, in a case that the starting edge of the first-level phase is a falling edge, the second clock gating circuit is selected, wherein the second clock gating circuit performs a combinational logic operation comprising at least a logical AND operation on the clock control signal and the first clock signal.

2. The design method according to claim 1, wherein the first clock gating circuit and the second clock gating circuit maintain the second clock signal at the predetermined level in clock cycles during which the clock control signal maintains an invalid state.

3. The design method according to claim 1, wherein the first clock gating circuit and the second clock gating circuit copy the first clock signal as the second clock signal in a clock cycle during which the clock control signal is flipped from an invalid state to a valid state.

4. The design method according to claim 1, wherein the first clock gating circuit and the second clock gating circuit copy the first clock signal as the second clock signal in clock cycles during which the clock control signal maintains a valid state.

5. The design method according to claim 1, wherein the first clock gating circuit performs a logical OR operation on an inverted signal of the clock control signal and the first clock signal to generate the second clock signal.

6. The design method according to claim 1, wherein the second clock gating circuit performs a logical AND operation on the clock control signal and the first clock signal to generate the second clock signal.

7. The design method according to claim 1, wherein in a case that the delay range of the clock control signal comprises a time period in which the first-level phase and a second-level phase of the first clock signal are adjacent to each other, a third clock gating circuit is selected to generate the second clock signal, wherein the third clock gating circuit maintains the second clock signal at the predetermined level at least in a next clock cycle following a clock cycle during which the clock control signal is flipped from a valid state to an invalid state, the third clock gating circuit performs a logical AND operation on a latched signal of the clock control signal and the first clock signal to generate the second clock signal.

8. The design method according to claim 7, wherein in a case that the third clock gating circuit is selected, the predetermined level is a level of the second-level phase.

9. The design method according to claim 1, wherein the step of coupling to be the flip-flop unit comprises selecting clock cycles during which the edge-triggered flip-flop transmits data according to the type of the selected clock gating circuit and the type of the edge-triggered flip-flop.

10. The design method according to claim 9, wherein the second clock signal provides a triggering edge of the edge-triggered flip-flop in a clock cycle during which the clock control signal is flipped, in a case that a starting edge at the first-level phase is the same as the triggering edge of the edge-triggered flip-flop.

11. The design method according to claim 9, wherein the second clock signal provides a triggering edge of the edge-triggered flip-flop in a clock cycle preceding a clock cycle during which the clock control signal is flipped, in a case that a starting edge at the first-level phase is opposite to the triggering edge of the edge-triggered flip-flop.

12. The design method according to claim 1, wherein the step of coupling to be the flip-flop unit comprises inverting the second clock signal to generate a third clock signal.

13. The design method according to claim 12, wherein the second clock signal provides a triggering edge of the edge-triggered flip-flop in a clock cycle during which the clock control signal is flipped, in a case that a starting edge at the first-level phase is the same as the triggering edge of the edge-triggered flip-flop.

14. The design method according to claim 12, wherein the third clock signal provides a triggering edge of the edge-triggered flip-flop in a clock cycle during which the clock control signal is flipped, in a case that a starting edge at the first-level phase is opposite to the triggering edge of the edge-triggered flip-flop.

15. The design method according to claim 1, wherein a high level of the clock control signal indicates a valid state, and a low level of the clock control signal indicates an invalid state.

16. The design method according to claim 1, wherein in a case that one of the first clock gating circuit and the second clock gating circuit is selected, the predetermined level is a level of the first-level phase.

* * * * *